R. H. PEARMAN.
CAMERA.
APPLICATION FILED JULY 31, 1919.

1,341,017.

Patented May 25, 1920.

INVENTOR.
Robert H Pearman
by Joseph H Miller
ATTORNEY.

UNITED STATES PATENT OFFICE.

ROBERT H. PEARMAN, OF BOSTON, MASSACHUSETTS, ASSIGNOR TO THOMAS E. STEERE, OF PROVIDENCE, RHODE ISLAND.

CAMERA.

1,341,017. Specification of Letters Patent. Patented May 25, 1920.

Application filed July 31, 1919. Serial No. 314,497.

*To all whom it may concern:*

Be it known that I, ROBERT H. PEARMAN, a citizen of the United States, residing at Boston, in the county of Suffolk and State of Massachusetts, have invented new and useful Improvements in Cameras, of which the following is a specification.

This invention relates to certain new and useful improvements in a camera and more particularly to that type of camera which is commercially employed for copying drawings, papers, and the like, directly onto the sensitized paper.

The principal object of the invention is to provide improved means for exposing variable areas of the sensitized paper to the lens whereby selected views or parts thereof may be photographed on the paper to the exclusion of the remainder.

The invention broadly consists more in an attachment consisting of a curtain mounted in a casing or housing with means for moving the curtain into the bellows compartment of the camera, and other means for indicating the position of the curtain in the bellows compartment.

Figure 1:
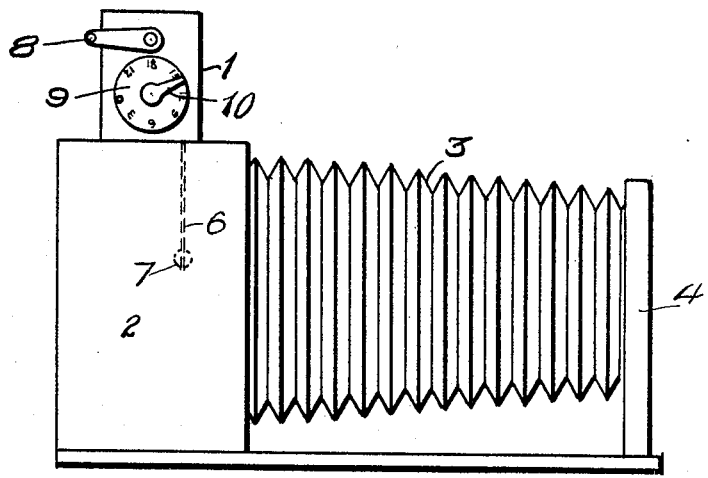
Figure 1 is a side elevation of a camera embodying the present invention.
Figure 2:
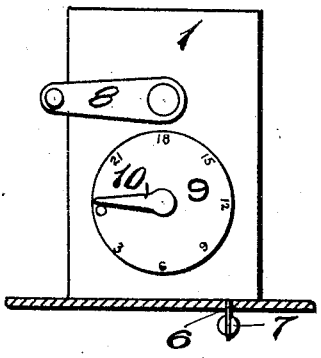
Fig. 2 is a like view of the attachment *per se;*.
Figure 3:
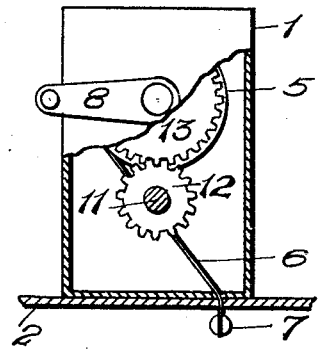
Fig. 3, is an elevation, partly in section showing the interior mechanism.

From Fig. 1 it will be observed that the box-like attachment or structure 1 surmounts the bellows compartment 2 of the camera embodying the bellows 3 and the lens holder or frame 4.

The box-like casing or housing 1 has journaled therein a curtain-supporting roller 5 which carries the curtain 6 that has its free end passing through coinciding slots, in the juxtaposed walls of the casing and camera or bellows compartment, into the latter. The said free end of the curtain is equipped with a weight 7 serving to pull the curtain taut and also to act as a stop to prevent the curtain from passing through its guiding slot. The roller 5 has one trunnion or shaft end extended through the end wall of the casing and has a crank handle 8 attached thereto by which the curtain may be wound and unwound.

For indicating the plane or position of the bottom or lower edge of the curtain a dial 9 is mounted on the end wall of the casing and this dial is traversed by a pointer 10 fixed on the projecting end of a short shaft 11. This shaft is journaled in said end wall and carries a small gear 12 on its inner end which meshes with a larger gear 13 fixed to rotate with the roller.

In practice, when it becomes necessary to block out or cover a portion of the sensitized paper, the curtain is accordingly lowered a predetermined distance, which is registered on the dial by the pointer. The curtain in an operative position is depicted by dotted lines in Fig. 1 wherein it will be observed that the upper portion of the sensitized paper, arranged behind the screen or curtain, will be unexposed when the shutter is opened, the view taking only on the lower exposed section of the paper.

The position of the bottom of the curtain is readily ascertained by referring to the dial so that more or less of the paper may accurately be blocked to exposure. The simplicity of the attachment and the material saving of paper add to the practicalness thereof.

Having thus described my invention, which I claim as new and desire to secure by Letters Patent is:—

1. A camera comprising a bellows compartment having a slot in its top, a box-like casing surmounting the compartment and provided with a coinciding slot, a roller journaled in the casing, a curtain wound on the roller and having its free end portion passed through the coinciding slots into the bellows compartment and weighted, a gear fixed on the roller, a shaft journaled in the adjacent wall of the casing, a gear on the shaft meshing with the first gear, a dial on the casing, a pointer carried by the shaft and coöperating with the dial, and an operating handle connected to the roller for winding and unwinding the curtain.

2. A camera comprising a bellows compartment having a slot in its top, a box-like casing surmounting the compartment and provided with a coinciding slot, a roller journaled in the casing, a curtain wound on the roller and having its free end portion passed through the coinciding slots into the bellows compartment and weighted, means for operating the roller to wind and unwind the curtain, and means for indicating the position of the bottom edge of the curtain.

3. A camera comprising a bellows compartment having a slot in its top, a box-like casing surmounting the compartment and provided with a coinciding slot, a roller journaled in the casing, a curtain wound on the roller and having its free end portion passed through the coinciding slots into the bellows compartment and weighted, and means operable by the roller for indicating the distance the curtain extends into the compartment.

4. An attachment for cameras, consisting of a casing formed independent of and adapted for securement to the top of a camera, a curtain, means within the casing carrying the curtain, and means exteriorly of the casing for operating the carrying means.

5. An attachment for cameras, consisting of a casing formed for securement to the top of a camera, a curtain formed to project downwardly through a slot formed therefor in the top of the camera, said curtain having a weighted end to engage the top of the camera and prevent the curtain from being withdrawn completely through the slot, carrying means for the roller, and means to operate the carrying means.

6. A camera comprising a bellows compartment having a slot in its top, a box-like casing surmounting the compartment and provided with a coinciding slot, a roller journaled in the casing, a curtain wound on the roller and having its free end portion passed through the coinciding slots into the bellows compartment and a weighting element borne by the lower end of the curtain and engageable with the top of the camera to prevent complete withdrawal of the curtain from the casing.

7. An attachment for cameras, consisting of a casing formed for securement to the top of a camera, a curtain, a roller in the casing carrying the curtain, a dial, a pointer connected to the roller and associated with the dial, and means carried by the casing to rotate the roller.

In testimony whereof I have signed my name to this specification in the presence of two subscribing witnesses.

ROBERT H. PEARMAN.

Witnesses:
  WORTHINGTON C. FORD,
  WARREN G. WHEELER.